(12) United States Patent
Joseph et al.

(10) Patent No.: US 11,113,890 B2
(45) Date of Patent: Sep. 7, 2021

(54) ARTIFICIAL INTELLIGENCE ENABLED MIXED REALITY SYSTEM AND METHOD

(71) Applicant: Cognizant Technology Solutions India Pvt. Ltd., Chennai (IN)

(72) Inventors: Rajkumar Joseph, Chennai (IN); Safuvan Puthan Peedika, Kavanur Post (IN); Arun Muthuraj Vedamanickam, Chennai (IN); Rajagopal Appakutty, Chennai (IN); Purwa Rathi, Gurgaon (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 0 days.

(21) Appl. No.: 16/744,781

(22) Filed: Jan. 16, 2020

(65) Prior Publication Data
US 2021/0134062 A1 May 6, 2021

(30) Foreign Application Priority Data

Nov. 4, 2019 (IN) .............................. 201941044684

(51) Int. Cl.
| | |
|---|---|
| *G10L 25/63* | (2013.01) |
| *G06T 19/00* | (2011.01) |
| *G06N 3/04* | (2006.01) |
| *H04L 29/06* | (2006.01) |
| *G06K 9/00* | (2006.01) |

(52) U.S. Cl.
CPC ........ *G06T 19/006* (2013.01); *G06K 9/00315* (2013.01); *G06K 9/00335* (2013.01); *G06N 3/0454* (2013.01); *G10L 25/63* (2013.01); *H04L 67/38* (2013.01)

(58) Field of Classification Search
CPC .............. G06T 19/006; G06K 9/00315; G06K 9/00335; G06N 3/0454; G10L 25/63; H04L 67/38
See application file for complete search history.

(56) References Cited

U.S. PATENT DOCUMENTS 6,466,654 B1 * 10/2002 Cooper ................... G10L 13/00
379/88.01
9,500,865 B2 11/2016 Chen
(Continued)

FOREIGN PATENT DOCUMENTS

| JP | 6066676 B2 | 1/2017 |
|---|---|---|
| WO | 2014071062 A2 | 5/2014 |
| WO | 2016111641 A1 | 7/2016 |

*Primary Examiner* — Jitesh Patel
(74) *Attorney, Agent, or Firm* — Cantor Colburn LLP

(57) ABSTRACT

The present invention relates to an artificial intelligence based system and method for moderating interaction between interacting users. The attempt is to improve emotional intelligence of users so that a seasoned response and reaction is observed during interaction, even if situations of conflict arise. The disclosure, thus, provides for a mixed reality glass powered assistant that displays the moderated expressions of a customer to the service provider. For the same, the analytical engine upon determining the negative emotions of customer, transforms the image of customer and adds smile to his face, which is presented to the service provider via a mixed reality glass so that he responds back to the customer in a positive manner.

23 Claims, 4 Drawing Sheets

(56) References Cited

U.S. PATENT DOCUMENTS

| | | | | |
|---|---|---|---|---|
| 10,293,260 B1* | 5/2019 | Evans | ................... | A63F 13/67 |
| 2003/0156134 A1* | 8/2003 | Kim | ................... | G06Q 30/02 |
| | | | | 715/753 |
| 2008/0096533 A1* | 4/2008 | Manfredi | ............... | G06N 3/006 |
| | | | | 455/412.1 |
| 2009/0055484 A1* | 2/2009 | Vuong | ............... | G06Q 10/107 |
| | | | | 709/206 |
| 2010/0121808 A1* | 5/2010 | Kuhn | ................... | G07F 17/32 |
| | | | | 706/50 |
| 2010/0267450 A1* | 10/2010 | McMain | ............... | A63F 13/822 |
| | | | | 463/30 |
| 2011/0010325 A1* | 1/2011 | Brillhart | ................ | G06N 5/02 |
| | | | | 706/47 |
| 2014/0208272 A1* | 7/2014 | Vats | ................... | G06T 19/20 |
| | | | | 715/852 |
| 2015/0286858 A1* | 10/2015 | Shaburov | ............... | G06T 7/344 |
| | | | | 382/103 |

* cited by examiner

Retrieving input data with respect to one or more users
401

Extracting facial expressions, bodily expressions, aural and other symptomatic characteristics from input data
402

Determining if an AI engine needs to intervene based on emotional health of interacting users
403

Applying of adjustment to a degree of obtaining normalized emotions of a user in an event the emotional health deteriorates
404

Displaying the normalized emotions to another user equipped with a virtual assistant
405

Fig. 4

ARTIFICIAL INTELLIGENCE ENABLED MIXED REALITY SYSTEM AND METHOD

CROSS REFERENCE TO RELATED APPLICATION

This application is related to and claims the benefit of Indian Patent Application Number 201941044684 filed on Nov. 4, 2019, the contents of which are herein incorporated by reference in their entirety.

FIELD OF INVENTION

The subject matter described herein, in general, relates to an artificial intelligence based mixed reality system and method, and, in particular, relates to application of artificial intelligence for achieving a mixed reality experience that automatically moderates interaction between plurality of users to create a healthy and emotionally intelligent atmosphere.

BACKGROUND OF INVENTION

Stress, anxiety, depression or mood swings are few of the most talked about disorders of people's emotional health today. Whether at work or home, on road or at retail store, mental and emotional health disorders take a toll on every aspect of an affected person's life. In this fast-paced world, people hardly get time to stop, rest, ponder and reflect on factors affecting their emotional and psychological performance.

In general, expectations are soaring high, while the patience is at its lowest ebb. Though certain amount of stress and anxiety is normal at work; however persistent, excessive and erratic emotional variations interferes in smooth functioning of life at both personal and professional front. A recent study demonstrates that one of the biggest drivers of work performance is interpersonal relationships. Work, being a collaborative environment demands immense cooperation and perseverance from employees, especially when catering to reverent clients.

Still, no wonder how better the client has been dealt with, dealing resolutely with an angry or disgruntled customer or a difficult boss almost on a daylong basis may trigger a tipping point that rescinds all the hard work ever gone in rapport building. Consequently, negative energy flows in, which escalate hostilities and sways away with it all positivity that business strives for. Consequences for such rough interactions are hard cheese for both the company and the client.

Further, in any given adverse situations, some of the weirdest and most dreadful reactionary responses are observed of the people, say for example in a road accident. Life of an individual has sometimes paid the price of a dented body of the vehicle. Such situations can be extended to almost any other sphere of life when one's ranting temperament has outweighed the rationality of one's reaction. One progressive approach to stabilize mental and emotional health while managing crucial conversations can be to ensure that both parties maintain their calm and composure in all kinds of adversities.

But, as will be agreed by all, most simple says have most hard ways. To make this task humanely possible, it is desirous that some means of moderating the attacking arguments is devised that is able to accurately assess the point of intervention during the argument and make the agitated person appear more pleasant and cheerful in his expressions than he actually is. This ostensible application of eugenic principles may be helpful in bringing out most warm and hearty expressions in between the otherwise belligerent conversations.

It is with respect to these and other general considerations that aspects disclosed herein have been made. In addition, although relatively specific problems may be discussed, it should be understood that the aspects should not be limited to solving the specific problems identified in the background or elsewhere in this disclosure. Accordingly, the limitations of contemporary solutions emphasize upon a need for a system and method capable of understanding the context of conversation between individuals; evaluating whenever the conversation is taking a rough course; and assuaging the intense atmosphere by making the enraged expressions visible as conciliatory ones for the other person.

OBJECTS OF THE INVENTION

The primary object of the present disclosure is to provide an artificial intelligence (AI) based mixed reality experience to enhance relationships during face-to-face people interactions.

Another object of this disclosure is to provide an intelligent system and method for automatically enabling a cordial atmosphere amongst plurality of users in order to achieve healthy emotional intelligence.

Yet another object of the disclosure is to provide a mixed reality based system and method that is capable of moderating interaction amongst the plurality of users and diffusing any kind of adverse atmosphere.

Yet other object of the present disclosure is to provide an AI powered mixed reality system and method that strategically introduces a pleasant emotion on an infuriated person to avoid reactive response from his audience, thereby maintaining the decorum and sanctity of such interaction.

In yet another embodiment, the disclosure provides a dynamic system and method capable of strategically intervening in an event of a conversation taking an unpleasant course and re-directing it towards a more conciliatory one.

Still another embodiment of present disclosure provides an AI driven system capable of assessing conversational context and emotional tone of conversation of the interacting users and selecting emotionally appropriate expressions for them to improve trust and engagement therebetween.

These and other objects will become apparent from the ensuing description of the present invention.

SUMMARY OF THE INVENTION

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Briefly described, in a preferred embodiment, the present disclosure overcomes the above-mentioned disadvantages, and meets the recognized need by providing an artificial intelligence based system and methodology for moderating interaction amongst plurality of users. The system, for instance, comprises of an input module configured to receive image data, speech data and physiological signals of a first user from amongst the plurality of users. Then, the extraction module extracts dynamically varying facial expressions, bodily expressions, aural and other symptomatic characteristics from the received image data, speech data and the physiological signals. Now, the artificial intelligence engine performs context driven emotional assessment on the dynamically varying facial expressions, bodily expressions, aural and other symptomatic characteristics. It further applies adjustment to a degree of obtaining normalized emotions in an event the context driven emotional assessment is higher than a predetermined threshold. Finally, a virtual assistant is configured to display normalized emotions of the first user to one or more other users such that a moderated response is generated from the one or more of the plurality of users to the adjusted emotions of the first user.

In one aspect of the disclosure, the normalized emotions refer to emotions other than negative emotions such as anger, disgust, anxiety, fatigue or the like.

In another aspect of the disclosure, a method for moderating interaction amongst plurality of users is proposed. The method comprising of following steps: receiving image data, speech data and physiological signals of a first user from amongst the plurality of users; extracting dynamically varying facial expressions, bodily expressions, aural and other symptomatic characteristics from the received image data, speech data and the physiological signals; performing context driven emotional assessment on the dynamically varying facial expressions, bodily expressions, aural and other symptomatic characteristics; applying adjustment to a degree of obtaining normalized emotions in an event the context driven emotional assessment is higher than a predetermined threshold; and displaying, via a virtual assistant, normalized emotions of the first user to one or more other users such that a moderated response is generated from the one or more of the plurality of users to the adjusted emotions of the first user.

These and other aspects, features and advantages of the present invention will be described or become apparent from the following detailed description of preferred embodiments.

BRIEF DESCRIPTION OF THE DRAWINGS

FIG. 4 is a workflow for moderation of interaction between plurality of users, in accordance with one preferred embodiment of present disclosure.

DETAILED DESCRIPTION OF THE EMBODIMENTS

It has to be understood and acknowledged for this specification and claims and for purposes of illustration, the invention is described in the context of moderating interaction between customer and service provider, but it will be understood that the system and method of the present invention can be applied in a variety of contexts and domains.

Figure 1:
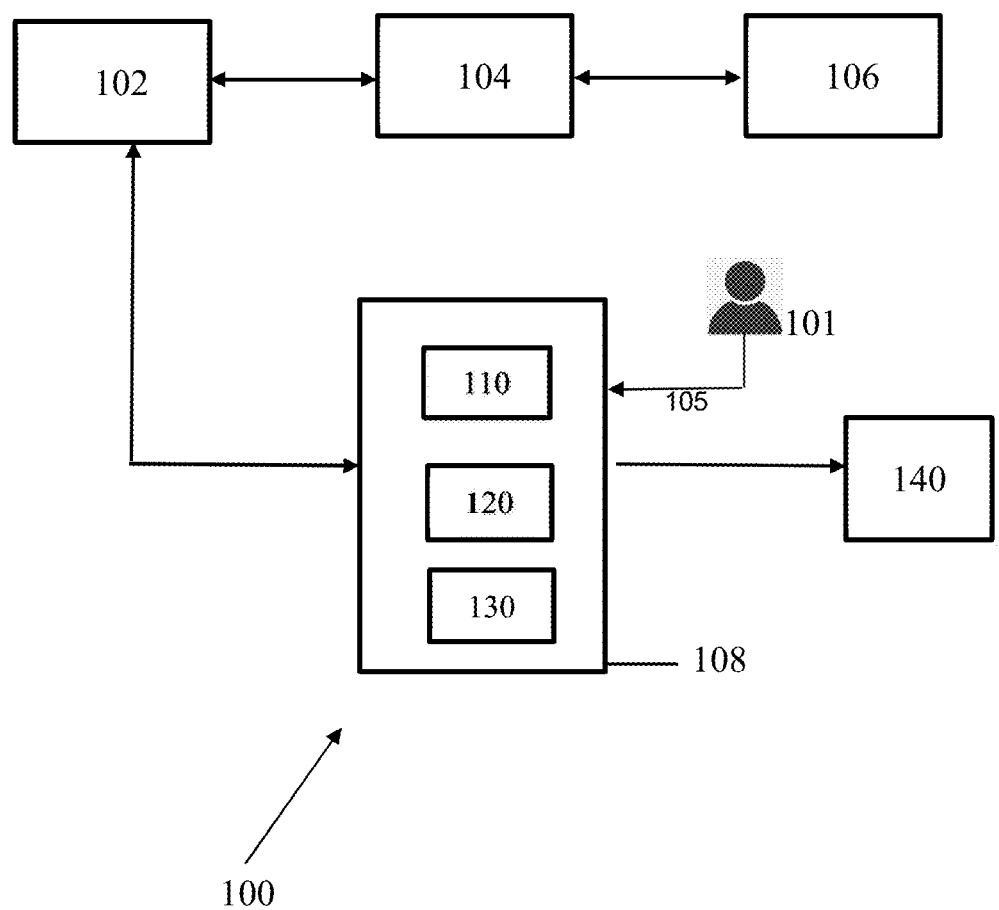
FIG. 1 is a block diagram of a system environment illustrating moderation of interaction between plurality of users, as shown in accordance with a preferred embodiment of the present disclosure.
Figure 2:
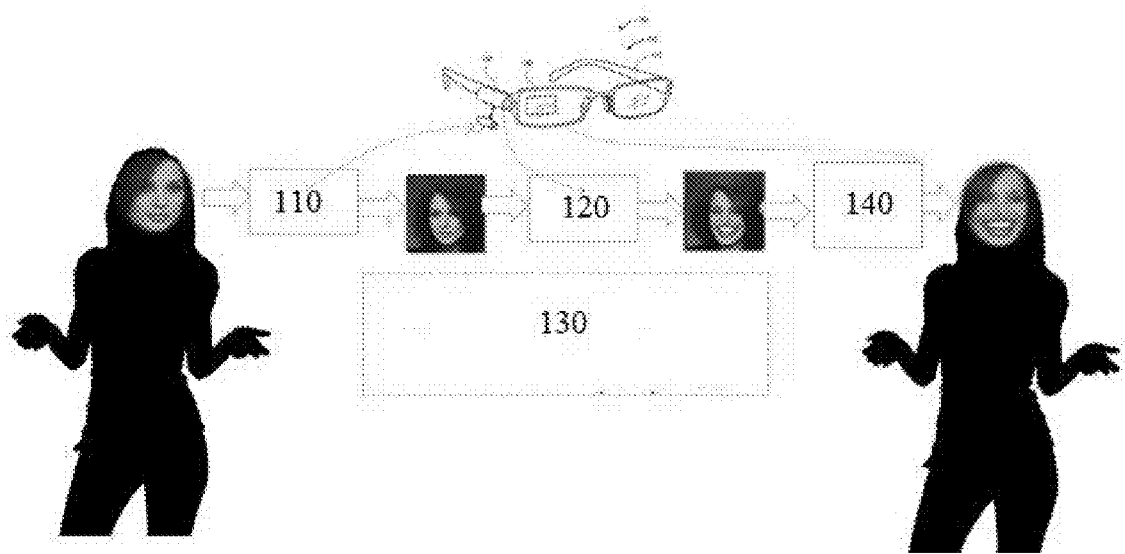
FIG. 2 is a schematic representation of system architecture, in accordance with one preferred embodiment of present disclosure.
Figure 3:
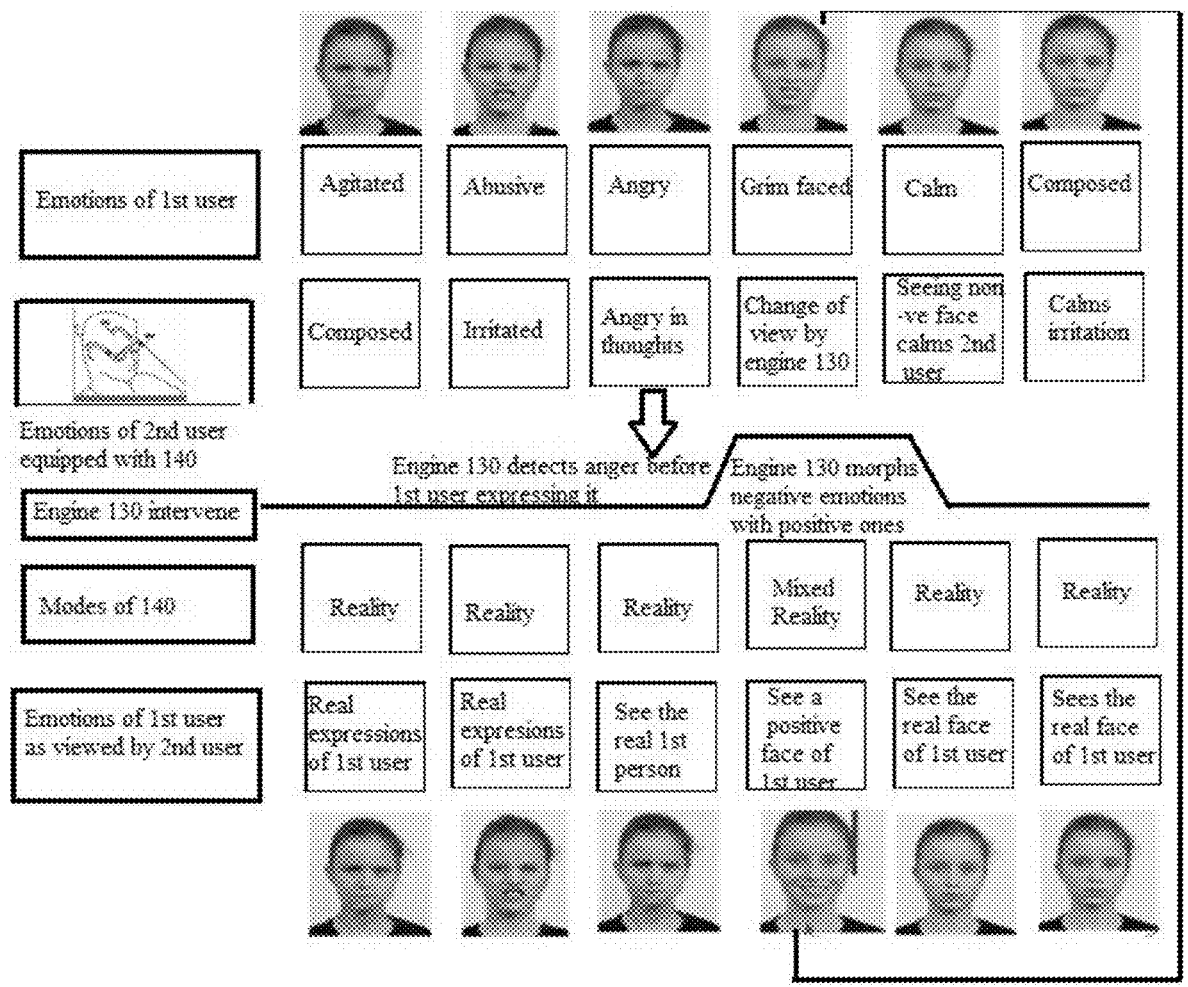
FIG. 3 illustrates invoking of AI engine during client interaction, in accordance with one preferred embodiment of present disclosure.

In describing the preferred and alternate embodiments of the present disclosure, as illustrated in FIGS. 1 and 2, specific terminology is employed for the sake of clarity. The disclosure, however, is not intended to be limited to the specific terminology so selected, and it is to be understood that each specific element includes all technical equivalents that operate in a similar manner to accomplish similar functions. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. The disclosed embodiments are merely exemplary methods of the invention, which may be embodied in various forms.

The present invention is described below with reference to methods and systems in accordance with general embodiments of present disclosure. The instructions may be loaded into the system, which when executed upon such a computer-implemented system—a general-purpose computer or a special purpose hardware based computer systems, creates means for training the system and implementing functions of various modules hosted by the system. Accordingly, the present invention may take the form of an entirely hardware embodiment, an entirely software embodiment, or an embodiment combining software and hardware aspects.

Referring now to FIG. 1, the system 100, in its basic configuration is a computer-based system for moderating interaction between the plurality of users. As illustrated in FIG. 1, a functional block diagram of exemplary system 100 provides a suitable environment for implementing embodiments of present disclosure. Following the illustration, the architecture of system 100 is shown to comprise of various subsystems such as central processing unit (CPU) 102 coupled to random access memory (RAM) 104 to execute instructions stored therein, read-only memory (ROM) 106, various sub routines to transmit information between the subsystems via a communication network 105 (not shown). The list here is exemplary only and should not be considered limiting.

The system further comprises of an operating system 108 that provisions an input module 110, an extraction module 120 and an artificial intelligence (AI) engine 130 for performing variety of actions associated with obtaining image data, speech data and physiological data of the first user, extracting dynamically varying expressions of the first user, and applying adjustment to a degree of obtaining normalized emotions. The system 100 additionally includes a mixed reality virtual assistant device 140 that displays normalized emotions of the first users to a second user or other user or a user other than the first user (these terms being "replaceably used" throughout the specification).

In accordance with one particular embodiment, the system 100 for moderating interaction amongst plurality of users ($101_a$, $101_b$, $101_c$, $101_d$ ... $101_n$, collectively referred to as 101) comprises of: an input module 110 that is configured to receive input from a first user via a communication network 105. In some working embodiments, the network 105 may include the internet or any other network capable of facilitating communication amongst the system module and external devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network, an Ethernet connection and the like.

Next, as shown in FIG. 2, the extraction module 120 is configured to extract relevant characteristic features from the received input of 110. The artificial intelligence engine 130 then performs emotional assessment from the extracted characteristic features and apply effective adjustment to a degree of obtaining normalized emotions. Finally, a virtual assistant interface 140 displays the normalized emotions to the audience of first user to incite a moderated response from said audience.

Generally speaking, the input module 110 is configured to receive image data, speech data and physiological signals of a first user from amongst plurality of users ($101_a$, $101_b$, $101_c$, $101_d$ . . . $101_n$). In one general embodiment of present disclosure, the system 100 may further comprise of one or more camera or other image capturing devices ($103_a$, $103_b$, $103_c$ . . . $103_n$, collectively referred by numeral 103) that captures images of the first user from different angles or perspectives or different portions of frequency spectrum for transmitting to the input module 110.

For example, the cameras may be mounted on front, top, rear, left and right sides of the first user or person interacting to retrieve image information used as one of input feed. This image information may include facial expressions, body language, eye movements, gestures, emotion signs, and other such micro indications of the first user 101. Alternately, the image data may further include a photo or a video recorded by the camera from which expressions of interest may be extracted by the extraction module 120 (discussed later).

In one alternate embodiment of present disclosure, the system 100 further comprises of one more audio sensors or haptic sensors ($104_a$, $104_b$, $104_c$, . . . $104_n$, collectively referred by numeral 104). These sensors 104 are capable of capturing speech data of the first user 101 along with other prosodic features such as volume, pitch, speed, strength and tone of speech for transmitting to the input module 110.

In yet another working embodiment of present disclosure, the system 100 further comprises of biometric sensors such as pulse sensor, a heartbeat sensor, a blood pressure sensor, a respiratory rate sensor, or one or more pace frequency sensor to detect and record physiological signals such as blood pressure, pulse rate, heart rate, body temperature, and so forth etc. of the first user for transmitting to the input module 110. In alternative aspects, the image capturing devices 103, audio or haptic sensors 104 or the biometric sensors are not part of the system 100 and are instead separate and distinct from the system 100. In these embodiments, the system 100 communicates with the image capturing devices 103, audio or haptic sensors 104 or the biometric sensors via a network 105. In some aspects, the network 105 is a distributed computing network, such as the internet.

Next, the extraction module 120 extracts dynamically varying facial expressions, bodily expressions, aural and other symptomatic characteristics from the image data, speech data and the physiological signals received by the input module 110. In one aspect of present disclosure, the extraction module 120 is operable to provide image data, speech data and physiological signals related data to a 3-dimenisonal convolutional neural network (CNN) to extract facial expressions, bodily expressions, aural and other symptomatic characteristics therefrom.

Following from above, the extraction module 120 now tracks the progress of extraction of facial expressions, bodily expressions, aural and other symptomatic characteristics corresponding to the image data, speech data and physiological signals related data based Long short term memory (LSTM) units over a period time. The two different fusion network models vis-à-vis CNN and LSTM are directly processed based on length of time the network is trained to give the output from the analyzed input data. In one other exemplary embodiment, in order to process sequence or time varying data such as speech, audio or physiological signals, a neural network combination of recurrent neural network (RNN) and LSTM is deployed.

These neural networks may include one or more CNN layers and, optionally, one or more fully connected layers that help reduce variations in dimensions of data fed to the LSTM layers that are effective for temporal modeling. The output of CNN layer is, thus, fed to the LSTM neural network (including one or more LSTM layers) that effectively disentangles underlying variations within the input data. The combination of CNN-LSTM layers into one unified framework facilitates achieving accuracy in extraction process; the extracted output then fed to the AI engine 130 for further analysis and correlations (as discussed in subsequent paragraphs).

In one of the noteworthy contribution of this disclosure, the system 100 comprises of an artificial intelligence engine 130 that majorly performs the following tasks. Firstly, the engine 130 performs context driven emotional assessment on the dynamically varying facial expressions, bodily expressions, aural and other symptomatic characteristics. In order to derive the context driven sentiments, the engine 130 at first determines the context of interaction amongst the plurality of users. In one working embodiment of present disclosure, the AI engine 130 does sentiment analysis of the speech conversations and derives conversational context from sophisticated natural language programming technique or utilizing deep learning approach. In certain exemplary embodiments, the AI engine 130 analyzes the speech sentences and emotional variations associated with speech sentences.

Thereafter, the AI engine 130 associates a presentation of emotional state or a label corresponding to the assessed context based on occurrence of speech elements and emotional tone associated therewith using feed forward neural network model or a learning algorithm or a vector system. In one certain example embodiment, the emotional state may be assigned utilizing a simple heuristic rule so that a positive emotion receives a score or emotion label of n, a neutral emotion receives a score or label or n−1, and a negative emotion receives an emotion label or score of n−2.

Alternately, in one other example embodiment, a multiple class support vector machine (SVM) model is trained to determine the sentiment or emotion associated with user image, speech or biometric data. In some aspects, the AI engine 130 may also perform analysis based on prosodic features; say for any recorded speech of the user to judge how positive, negative or neutral is the user during his conversation. This helps the system make a better context-sensitive classification or understanding of user's emotions.

Finally, the represented emotional state score is compared with a predetermined threshold for obtaining emotional assessment relevancy score. In one aspect of disclosure, the emotional assessment relevancy score is based on the deep semantic similarity model and a recurrent neural network that compares a pre-stored emotional state and the presently received emotional state of the user. In this way, a tab of general emotional health between the users is maintained, which invokes intervention by the engine 130 whenever emotional health deteriorates. In one embodiment, the neural network implemented is a recurrent type, which is able to memorize its previous status and use it as an input to evolve.

Now, the AI engine 130 is capable of intervening at a suitable juncture of conversation and effectively apply adjustment to a degree of obtaining normalized emotions, particularly in a situation when there is a probability of any conflict or a heated discussion or argument or in any other adverse situation triggered by any unpleasant/awful talk or expressions. In accordance with one exemplary embodiment, the emotions in an adverse situation may be that of, though not limited to, anger, disgust, anxiety, fatigue or the like.

The AI engine 130 then applies adjustment to a degree of obtaining normalized emotions of the first user in an event the context driven emotional assessment is higher than a predetermined threshold. For example, the negative emotions of a first user may be morphed with that of positive emotions using variational autoencoder-generative adversarial network. Preferably, the emotional state is deduced at successive time intervals to confirm real time emotional state and it's variability with respect to the threshold value such that AI engine 130 is actively invoked to take charge of situation at foreseeable point of time.

Finally, a virtual assistant 140 acts like an interface between the first user and a plurality of other users conversing with the first user. The intent of virtual assistant 140 is to display the normalized emotions of the first user to the other interacting user so that a harmonious interaction can be maintained. In a certain embodiment, the users may interact via a bidirectional communication network using various connections such as a USB port, a parallel port, and so forth.

In accordance with one exemplary embodiment, the virtual assistant 140 may be any mixed reality capable device that can be worn by the other user interacting with the first user. Mixed Reality is an advanced form of augmented reality, where a digital image is displayed on a transparent LCD glass panel, allowing the user to see the reality but an artificial image is placed on top of the user's view of the reality. In one exemplary embodiment, the virtual assistant 140 is a smart glass, which may be either a wearable glasswear, as indicated above, or office cubicle glass partition device or any virtual touch screen environment that enables the user to see the normalized expressions of person interacting. For example, a bank cashier see a customer via a glass partition, where a glass can be an LCD screen.

According to one working embodiment of present disclosure, the virtual assistant 140 is operable to select amongst visualization mode, virtual reality mode, augmented reality mode or mixed reality mode or the combination thereof for display of the normalized emotions. Furthermore, the virtual assistant 140 is configured to replace and display thereupon the bodily expressions, aural and other symptomatic characteristics of the first user indicative of the context driven emotional assessment higher than the predetermined threshold.

Imagine a scenario where an angry or irritable customer is about to blast the service provider for his ineffectiveness. Here, it is extremely important that the service provider maintains his calm and does not respond reactively to the customer's disgust. It is here that the extraction module 120 assists in extracting the change of expressions and other physiological signals, signaling the AI engine 130 of the gradual change in mood and behavior towards intense. Here, AI engine 130 automatically intervenes, diffuses a tense atmosphere and boosts the angry customer's face and expressions into pleasant ones.

Importantly, the service provider is equipped with a virtual assistant 140 (which in this case is a wearable device) that is electrically coupled with the AI engine 130. The device 140 will now enable the customer see a more smiling and a pleasant face than the actual reality. Instinctively, the service provider would respond in a more cordial and harmonious manner compared to reacting with an emotional outburst if no such device is worn.

In accordance with one significant aspect of present disclosure, the system 100 may further record and make use of recorded historical activity of temperament of the first user. Preferably, an emotional profile of the user can be maintained. The emotional profile can be conveniently referred to whenever discussion with first user happens. The AI engine 130 is thus pre-aware of general temperament of user and is guided all through to track change in mood, and eventual generation of normalized emotions.

Now, FIG. 4 sequentially depicts method steps involved in moderating interaction amongst plurality of users, each step indicative of one or more specified operations or instructions performed as directed by system 100. In step 401, the input data is generated with respect to the first user. The input data broadly encompasses one or more images of the user taken from different angles or perspectives or different portions of frequency spectrum, prosodic features of user such as volume, pitch, speed, strength and tone of speech, and other physiological signals like pulse rate, blood pressure, respiratory rate etc.

In step 402, dynamically varying facial expressions, bodily expressions, aural and other symptomatic characteristics are extracted from the retrieved input data. The context driven emotions and sentiments of conversing users are tracked down from extracted data that are used to determine the general emotional health within the room. In step 403, the AI Engine 130 strategically opts to intervene and act if this emotional health deteriorates. This may, in one suitable illustration, may be a display of anger, disgust, anxiety, fatigue or the like. Based on emotional health of plurality of interacting users, the AI engine 130 may apply adjustment to a degree of obtaining normalized emotions of the user in an event of any conflict or in case unpleasant/awful talk or expressions are witnessed, as shown in step 404.

Accordingly, in step 405 the other user equips himself with a virtual assistant 140, which may be in form of a wearable device or any smart glass or office cubicle glass partition device (where the glass can be LCD screen) or the like, to enable himself display normalized emotions of the first user. Thus, the negative or unpleasant emotions of the first user are morphed with any of the positive ones (for example by adding a smile onto the face of first user), which helps the receiver in maintaining his calm, regaining his composure and responding in a thoughtful manner.

For a person equipped with a mixed reality virtual assistant 140, any unpleasant expressions of an angry or disgusted customer are transformed on the fly into a pleasant ones. Thus, the brain of person receiving the morphed expressions, relaxes and he can keep a calm during the conversation. Imagine a feedback scenario for a salesperson, who when responds in a thoughtful and emotionally balanced way is likely to win a sale or deal even if the customer is not in a very great mood.

Similarly, for nurses/doctors, showing a pleasant face to an agitated patient in ward can give emotional healing. Even during customer meetings, keeping a smiling face can enhance the outcome of meetings. Also, the bank clerks who face irate customers, the bank may instruct the staff to serve the customers with a smiling face. The system has immense utility in any adverse situation, say in a road rage, where a person's vehicle accidentally crashing to another vehicle receives cordial expressions from the driver, and in turn apologizes for his mistake. The situation is comfortably settled between the two drivers without having resort to any unpleasantly furious situation.

The foregoing description is a specific embodiment of the present disclosure. It should be appreciated that this embodiment is described for purpose of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

What is claimed is:

1. A system for moderating interaction amongst plurality of users, comprising:
   an input module configured to receive image data, speech data and physiological signals of a first user from amongst the plurality of users;
   an extraction module configured to extract dynamically varying facial expressions, bodily expressions, and aural characteristics from the received image data, speech data and the physiological signals;
   an artificial intelligence engine configured to:
      perform context driven emotional assessment on the dynamically varying facial expressions, bodily expressions, and aural characteristics;
      apply adjustment to a degree of obtaining normalized emotions in an event the context driven emotional assessment is higher than a predetermined threshold; and
   a virtual assistant configured to display normalized emotions of the first user to one or more other users such that a moderated response is generated from the one or more of the plurality of users to the adjusted emotions of the first user.

2. The system, as claimed in accordance with claim 1, wherein the input module is further configured to receive historical activity of temperament of the first user.

3. The system, as claimed in accordance with claim 1, further comprising one or more cameras or other image capturing devices that are configured to capture the image of the first user from different angles or different portions of frequency spectrum for transmitting to the input module.

4. The system, as claimed in accordance with claim 1, further comprising one or more audio sensors or haptic sensors that are configured to capture speech data of the first user along with prosodic features: volume, pitch, speed, strength and tone of speech for transmitting to the input module.

5. The system, as claimed in accordance with claim 1, further comprising a pulse sensor, a heartbeat sensor, a blood pressure sensor, a respiratory rate sensor, or one or more pace frequency sensor to capture physiological signals of the first user for transmitting to the input module.

6. The system, as claimed in accordance with claim 1, wherein the extraction module is operable to provide image data and speech data to a 3-dimensional convolutional neural network (CNN) to extract the facial expressions, bodily expressions, and aural characteristics from the image and speech data.

7. The system, as claimed in accordance with claim 5, wherein the extraction module is further operable to track progress of extraction of the facial expressions, bodily expressions, and aural characteristics based on long short-term memory (LSTM) units.

8. The system, as claimed in accordance with claim 1, wherein the context driven sentiment is assessed based on: determination of context of interaction amongst the plurality of users from the dynamically varying facial expressions, bodily expressions, and aural characteristics;
   associate a representation of emotional state corresponding to the assessed context based on occurrence of speech elements and emotional tone associated therewith using feed forward neural network model; and
   compare the represented emotional state with a predetermined threshold for obtaining emotional assessment score.

9. The system, as claimed in accordance with claim 1, wherein the normalized emotions refer to emotions other than negative emotions: anger, disgust, anxiety, fatigue or the like.

10. The system, as claimed in accordance with claim 1, wherein artificial intelligence engine is configured to apply adjustment to the degree of obtaining the normalized emotions by morphing negative emotions of the first user with those of positive emotions using variational autoencoder-generative adversarial network.

11. The system, as claimed in accordance with claim 1, wherein the virtual assistant comprises of a wearable device configured to be worn by the plurality of users other than the first user to receive and display the normalized emotions of the first user to the plurality of users.

12. The system, as claimed in accordance with claim 11, wherein the wearable device is a wearable eyewear or a glass partition device, and is configured to select a visualization mode, virtual reality mode, augmented reality mode or mixed reality mode or the combination thereof for display of the normalized emotions.

13. A method for moderating interaction amongst plurality of users, comprising:
   receiving image data, speech data and physiological signals of a first user from amongst the plurality of users;
   extracting dynamically varying facial expressions, bodily expressions, and aural characteristics from the received image data, speech data and the physiological signals;
   performing context driven emotional assessment on the dynamically varying facial expressions, bodily expressions, and aural characteristics;
   applying adjustment to a degree of obtaining normalized emotions in an event the context driven emotional assessment is higher than a predetermined threshold; and
   displaying normalized emotions of the first user to one or more other users equipped with virtual assistant such that a moderated response is generated from the one or more of the plurality of users to the adjusted emotions of the first user.

14. The method, as claimed in accordance with claim 13, further comprising receiving historical activity of temperament of the first user.

15. The method, as claimed in accordance with claim 13, wherein the image data is captured from different angles or different portions of frequency spectrum by an image capturing device.

16. The method, as claimed in accordance with claim 13, wherein the speech data is captured along with prosodic features: volume, pitch, speed, strength and tone of speech.

17. The method, as claimed in accordance with claim 13, wherein the physiological signals consists measuring of pulse rate, heartbeat, blood pressure, respiratory rate, pace frequency and the like.

18. The method, as claimed in accordance with claim 13, wherein the facial expressions, bodily expressions, and aural characteristics are extracted using a 3-dimensional convolutional neural network (CNN) model.

19. The method, as claimed in accordance with claim 13, further comprising tracking of progress of extraction of the facial expressions, bodily expressions, and aural characteristics based on long short-term memory (LSTM) units.

20. The method, as claimed in accordance with claim 13, wherein the context driven sentiment assessment is performed by:
   determining context of interaction amongst the plurality of users from the dynamically varying facial expressions, bodily expressions, and aural characteristics;
   associating a representation of emotional state corresponding to the assessed context based on occurrence of speech elements and emotional tone associated therewith using feed forward neural network model; and
   comparing the represented emotional state with a predetermined threshold for obtaining emotional assessment score.

21. The method, as claimed in accordance with claim 13, wherein the normalized emotions refer to emotions other than negative emotions: anger, disgust, anxiety, fatigue or the like.

22. The method, as claimed in accordance with claim 13, wherein the normalized emotions are obtained by morphing negative emotions of the first user with those of positive emotions using variational autoencoder-generative adversarial network.

23. The method, as claimed in accordance with claim 13, wherein the virtual assistant comprises of a wearable device configured to be worn by the plurality of users other than the first user to receive and display the normalized emotions of the first user to the plurality of users.

\* \* \* \* \*